Jan. 14, 1969  R. S. LUNDIN  3,422,253
REVERSE COUNTING LOGIC SYSTEMS
Filed May 10, 1965  Sheet 1 of 3
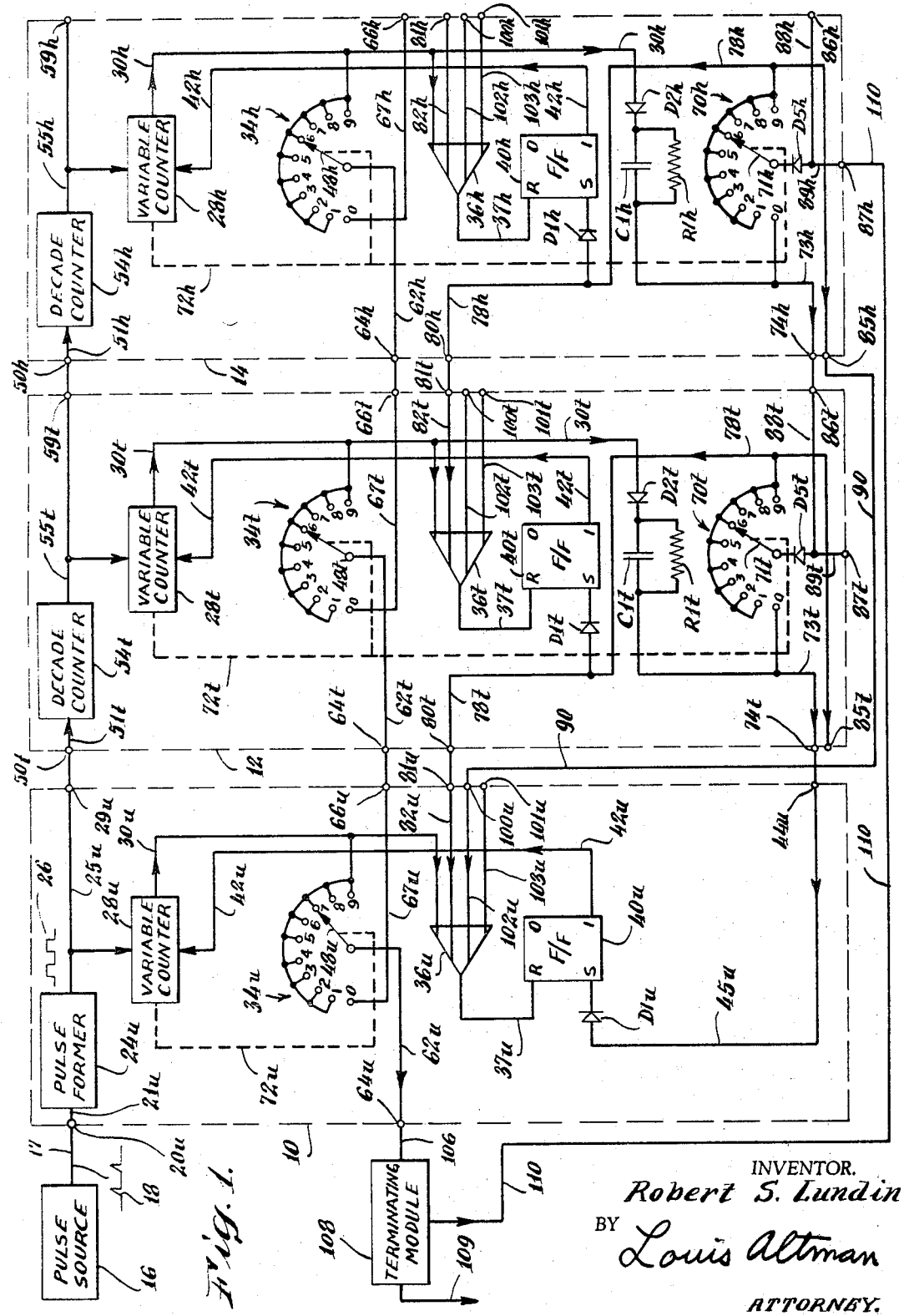
INVENTOR.
Robert S. Lundin
BY Louis Altman
ATTORNEY.

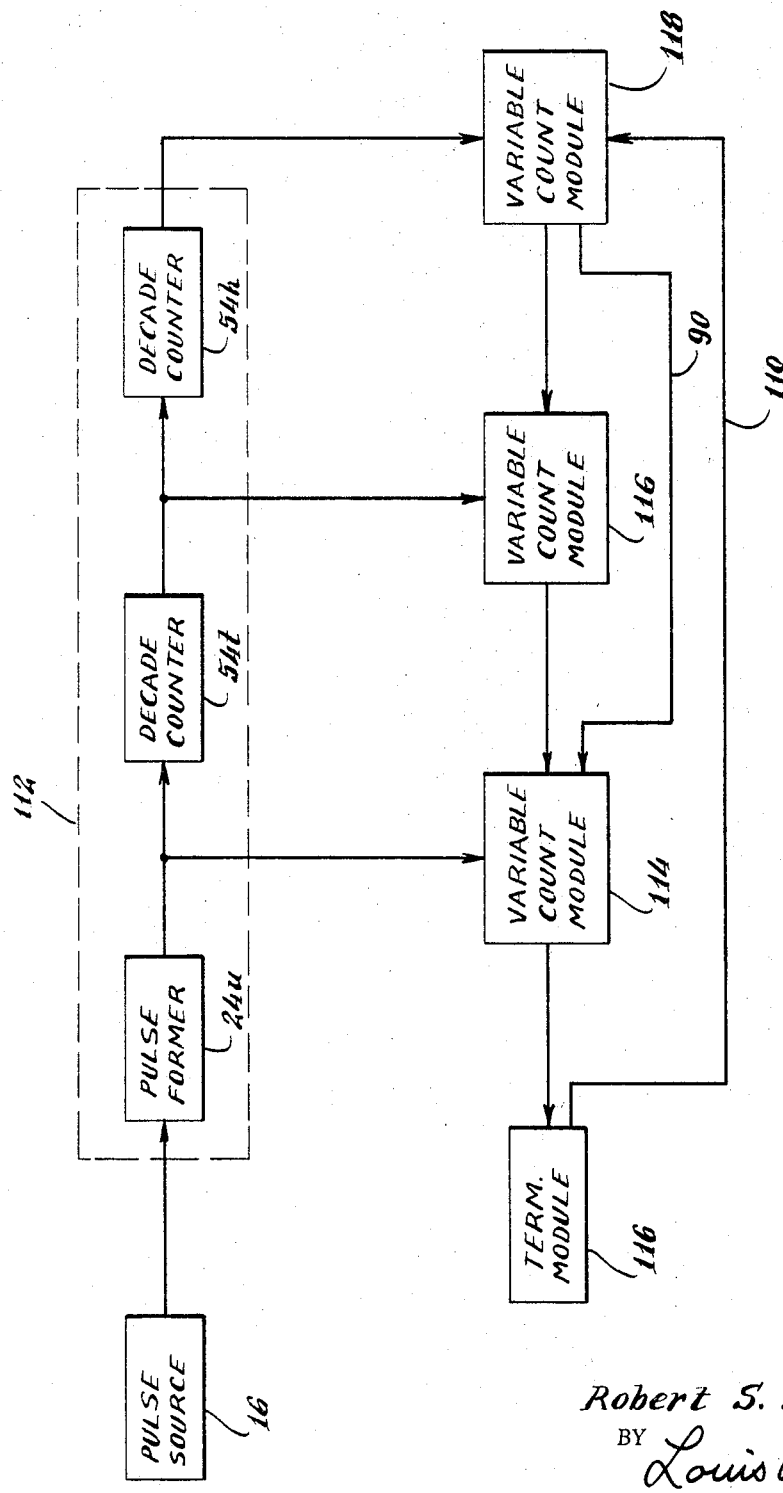

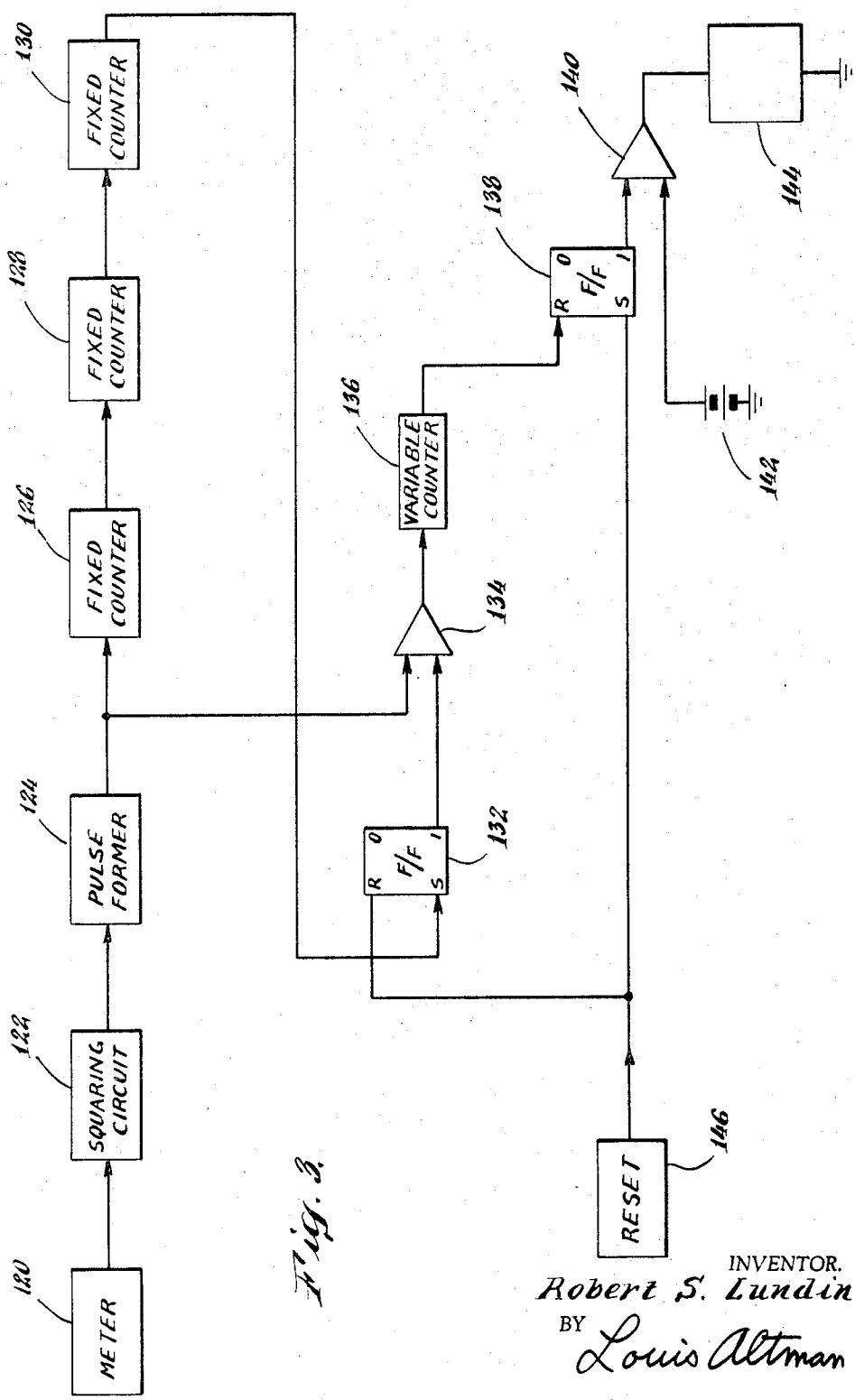

3,422,253
REVERSE COUNTING LOGIC SYSTEMS
Robert S. Lundin, Thomaston, Conn., assignor to General Time Corporation, New York, N.Y., a corporation of Delaware
Continuation-in-part of application Ser. No. 363,361, Apr. 29, 1964. This application May 10, 1965, Ser. No. 454,626
U.S. Cl. 235—92    16 Claims
Int. Cl. G06f 7/38; G06g 7/00

ABSTRACT OF THE DISCLOSURE

The present invention is a presettable counting system in which each stage except the first includes a fixed counter and a variable counter. In the first stage, the fixed counter is replaced by a pulse former. The stages are interconnected in such a manner that the most significant digit of the present number is counted first. This arrangement eliminates the need for control circuitry to disable the higher order fixed counters while lower order variable counters are counting.

---

This application is a continuation-in-part of my copending application entitled "Voltage-Controlled Adjustable Counter," Ser. No. 363,361, filed Apr. 29, 1964, now Patent No. 3,376,410 which is incorporated herein by reference.

This invention relates to reverse counting logic systems for counting electrical impulses. More specifically, it relates to a system of fixed and variable magnetic counters connected in cascade to count a preset total count of electrical impulses. When the preset total count has been attained, the system provides a control output. A fluid metering control system according to the invention is disclosed herein.

There are a wide variety of control applications where an inexpensive, mass-produced counting device of small size and light weight could be employed to count to a preset number within a count range. Neitzert, U.S. Patent No. 2,897,380, assigned to the same assignee as the present invention, describes a type of incremental magnetic counter to which the present invention is readily applicable. The magnetic core of such a counter is driven from one condition of magnetic saturation to its opposite condition of magnetic saturation in increments corresponding in number to a predetermined number of electric pulses applied to an input winding about the core. The final pulse magnetically saturates the core. The core then drops back to a residual level. The change in magnetic flux induces a reset signal. In response thereto, the core is returned to its original opposite condition of magnetic saturation. This change in flux produces an output pulse in an output winding.

This output pulse, which is of uniform volt-second content, may be used to effect a suitable control function or may be applied to additional magnetic counters. To increase the count capabilities of the device the magnetic counters are cascaded, i.e. connected in iterative serial order.

The principal disadvantage of the magnetic counters disclosed in the afore-mentioned Neitzert patent is that they cannot be conveniently adjusted to different count moduli. The count modulus of a magnetic counter is the number of input pulses of constant volt-second content required to drive the magnetic core from one condition of magnetic saturation to its opposite condition of magnetic saturation. It will be appreciated that convenient adjustability of the count modules provides versatility. That is, it is extremely desirable that the counters have the capability to be conveniently adjusted to count to any preset count total within a given range, and thus not have to be specifically factory designed to count to a particular fixed count total. Counters have a convenient adjustability feature can thus be readily mass-produced.

In my copending application for "Voltage-Controlled Adjustable Counter," Ser. No. 363,361, filed Apr. 29, 1964, now Patent No. 3,376,410 and assigned to the same assignee as the present invention, there is disclosed and claimed a variable magnetic counter which may be adjustably set to any count modulus within a given count range. This is accomplished by providing an adjustable voltage which is used to supplement the volt-second content of the electrical pulses applied to the input winding of the magnetic counter. Thus, this adjustable voltage may be set at various levels so as to vary the number of input pulses required to switch the core from one condition of magnetic saturation to its opposite condition of magnetic saturation. If the level of this adjustable voltage is increased, fewer input pulses are required.

As described in my above-noted copending application, a plurality of fixed and variable magnetic counters are cascaded together in order to increase the count range in which the system may operate. In counting to a preset count total, a variable-counter in a units module is initially enabled to count input pulses from a pulse source. The count modules of this variable counter is set to correspond to the lowest order digit of the preset count total. When the number of input pulses corresponding to the units or lowest order digit of the count total is counted, this variable counter generates an output pulse operating to disable itself, and to enable a fixed counter and a variable counter included in a first adder module. The variable counter in this first adder module is preset such that its count modulus corresponds to the next higher order digit of the preset count total. The variable counter is connected to receive output pulses from the fixed counter.

When this next higher order digit has been counted by the variable counter of this first adder module, the variable counter generates an output operating to disable itself and the associated fixed counter, and enable a fixed counter and a variable magnetic counter in a second adder module. This second adder module enables the fixed counter in the first adder module so that this variable counter responds to the count output of both fixed counters as connected in cascade. The count modulus variable counter corresponds to the next higher order digit of the preset count total.

It will thus be seen that the adder modules are energized in ordered sequence from the lowest order digit counting section to the highest order digit counting section. It will be appreciated that in order to avoid an ambiguous count, only one variable magnetic counter should be energized at any one time to count input pulses. Moreover, each fixed counter in succeeding adder modules must be disabled while a preceding module is counting to attain the digit count of a lower order digit. Thus, control circuitry must be provided to enable and disable both the fixed and variable magnetic counters in predetermined sequence. It will be appreciated that this control circuitry adds to the cost of a high count system.

A typical control problem to which the present invention is applicable is the metering of a predetermined quantity of a liquid of varying density. For example, in large dairies it is desired to fill containers with a predetermined quantity of milk. According to the prior art, this may be accomplished by weighing the milk or by sensing the attained liquid level.

According to my invention, a velocity flow meter is provided. This flow meter produces pulses corresponding to the total volume of milk passing therethrough. These pulses are counted by a counter according to the invention. When a predetermined count is attained, a valve is operated.

Accordingly, it is an object of the invention to provide a system selectably adjustable to count any preset number of counts.

Another object of the invention is to provide a high-count capacity system of the above character using cascaded fixed count modulus and variable count modulus counters.

A further object of the invention is to provide a system of the above character wherein the fixed count modulus counters are never required to be disabled; thus eliminating control elements previously necessary to enable and disable such fixed counters.

A still further object of the invention is to provide a system of the above character specifically adapted to performing a control function.

Yet a further object of the invention is to provide a system of the above character for counting electrical pulses.

Still another object of the invention is to provide a system of the above character employing electronic counters.

A still further object of the invention is to provide a system of the above character employing incremental magnetic counters.

Another object of the invention is to provide a metering system for measuring selectable quantities between predetermined limits.

A further object of the invention is to provide a metering system of the above character employing a counting system of the above character.

Yet another object of the invention is to provide a metering system of the above character employing a velocity flow meter.

Another object of the invention is to provide a system of the above character which is inexpensive to produce, reliable, and accurate, and which is constructed in a manner ideally suited to modularization.

A further object of the invention is to provide a system of the above character in which the count capacity can be expanded by adding identical modular counting stages in cascade.

Other objects of the invention will in part be obvious and will in part appear hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a schematic circuit diagram, partially in block form of a multi-stage hundreds range high-count system according to my invention;

FIGURE 2 is a block diagram showing an alternative manner in which count modules are interconnected to form a high-count system; and, FIGURE 3 is a schematic diagram, partially in block form, of a milk meter according to my invention.

Broadly stated, my invention provides a selectable counter for providing an output upon the attainment of a preselectable count total. In the disclosed embodiments of my invention, the counting system is adapted to count electrical impulses or pulses in order to attain the preselected count total. The electrical pulses to be counted are developed by a pulse source and applied to a pulse former. The pulse former operates to produce output pulses of uniform volt-second content corresponding in number to the number of input pulses received from the source. The output pulses from the pulse former are applied to an iterative series of fixed count modulus magnetic counters connected in cascade. Each fixed count modulus magnetic counter develops an output pulse when it has received a fixed number of input pulses. Thus, each fixed magnetic counter is a multiplier of the number of pulses received at its input. The last fixed count modulus counter of the iterative series thus produces an output when the source has generated a number of pulses equal to the fixed count moduli of the fixed counters multiplied together.

The last fixed magnetic counter in the iterative series develops an output which is applied to a first variable magnetic counter whose adjustable count modulus is set to correspond to the highest order digit of the preset count total. When the highest order digit has been counted, the variable magnetic counter generates an output pulse effective to disable itself and, at the same time, enable a second variable magnetic counter whose preset count modulus is set to correspond to the next lower order digit of the count total.

The second variable magnetic counter is connected to the output of the fixed magnetic counter immediately preceding the last fixed counter in the iterative series. Once the next lower order digit of the count total is satisfied, the second variable magnetic counter generates an output pulse to turn itself off and to enable a third variable magnetic counter.

This operation continues until the last variable magnetic counter for counting the lowest order digit of the count total is energized. If this last variable magnetic counter counts units digits, it is connected to the output of the pulse former. Thus, it counts the pulses generated by the source on a one to one ratio. When the lowest order digit of the count total is satisfied, the last variable magnetic counter provides an output to a terminating module signalling the attainment of the preselected count total.

Inasmuch as the highest order digit of the selected count total is counted first, all cascaded fixed magnetic counters are initially enabled. Only the variable counters corresponding to the lower order digit are disabled. After a higher order digit of the count total is counted, there is no need to disable the corresponding higher order fixed counter since it cannot produce an output before the time when the lowest order digit is counted. Thus, although the higher order fixed counters continue to count, they do not affect the counting operations of the lower order fixed and variable counters.

An additional feature of the invention resides in the modular construction of the counting stages cascaded together to form a high count system. Each counting stage or module is constructed to be identical so that they may be arbitrarily assigned to count any digit order. The modules are interchangeable and can be mass-produced. Expansion of the count range merely requires adding additional identical counting modules in cascade.

In one form of modularization, there is provided a units module and as many adder modules as required to provide the desired count range. The units module includes a pulse former and a variable counter. Each adder module includes both a fixed and a variable counter.

In another form of modularization, the pulse former and any number of fixed counters are connected in cascade to form one module. Identical variable count modules, each including a variable counter, are individually connected to the output of the pulse former or the output of a fixed counter.

The system of my invention has many uses, particularly in control applications. It can be used to numerically control machine tools. Traverse of the workpiece is translated into pulses which are counted in order to precisely position the workpiece at a predetermined location. My invention has application to packaging equipment to count items dispensed into containers. When a known quantity of items necessary to fill a container have been dispensed as determined by my invention, another empty container is moved to the dispensing point to be filled with the same quantity of such items. My invention also has application to control the blending together of two or more fluids. Flow meters generate pulses which are counted to effect controlled operation of valves to achieve preset blending proportions. In the same manner, pulses generated by a flow meter are counted to control the dispensing of a predetermined quantity of liquid necessary to fill containers.

In applications where the pulse count total is high but the necessary variations in this high count total are small, variable counters need not be assigned to each digit order of the count total. The controlled dispensing of liquids is such an application since the quantity of liquid to be dispensed in filling empty containers is typically constant. It is found, however, that a small "trim" count variation in the pulse count total generated by a flow meter is required to account for possible variations in the density of the liquid. Density variations are found to affect the pulse count total corresponding to the predetermined quantity of liquid to be dispensed in filling each container.

To provide an economical system for such an application, fixed counters are utilized to count to the lower limit of the "trim" count range. A variable counter is then enabled to count the preset "trim" count. When the "trim" count is satisfied, i.e. when the predetermined quantity of liquid has been dispensed to fill the container, the variable counter generates an output effective to close a flow valve. Wider ranges of "trim" counts are provided by employing several variable counters.

Referring now to FIGURE 1, a pulse counting system constructed according to the invention includes a units module, generally indicated at 10, and a pair of adder modules, generally indicated at 12 and 14, connected in cascade. A source 16 of pulses to be counted is connected to an input terminal 20u of the units module 10 over an output line 17. The pulses, indicated at 18, generated by source 16 may be periodic or aperiodic in nature at pulse rates ranging from 10,000 pulses per second down to essentially D.C. operation when input pulses are generated randomly.

The input pulses 18 generated by source 16 for application to input terminal 20u of the units module 10 are fed over line 21u to the input of a pulse former 24u. The suffix is used to identify those elements connected in the units module 10. The pulse former 24u is preferably constructed in the manner disclosed in my copending application for "Voltage-Controlled Adjustable Counter," Ser. No. 363,361, filed Apr. 29, 1964, and assigned to the assignee of the present invention. A suitable pulse former is also disclosed in Neitzert Patent No. 2,897,380. The pulse former 24u includes a saturable magnetic core having a generally square hysteresis loop. The pulses 18 to be counted are applied to an input transistor operating in response thereto to pass current through an input winding linking the magnetic core of the pulse former 24u. The core, initially in one condition of magnetic saturation, is driven beyond the opposite condition of magnetic saturation by operation of the input transistor in response to each input pulse. After the core has been driven past saturation, a sensing winding turns on a resetting transistor to send a surge of current through a resetting winding linking the core. The core is driven to its original condition of magnetic saturation to induce an output pulse in an output winding linking the core. The output pulses developed by the pulse former appear on output line 25u as indicated at 26. The output pulses 26 developed by the pulse former 24u in response to corresponding input pulses 18 are of uniform volt-second content as described in my above-noted copending application. When the rate of input pulses from source 16 is quite low, it may be necessary to shape the input pulses in order to achieve the desired pulse former operation. This can be readily accomplished by connecting another transistor in circuit with the pulse former input transistor such that the two transistors operate in the manner of a conventional Schmitt trigger. By so doing, adequate conduction of the input transistor to fully saturate the pulse former core is always achieved in response to each input pulse.

The output pulses 26 appearing on output line 25u from the pulse former 24u are applied to the input of a variable magnetic counter 28u. The variable magnetic counter 28u is preferably constructed in the manner described and claimed in my above-identified copending application, Ser. No. 363,361. Accordingly, the adjustable magnetic counter 28μ includes a saturable magnetic core which is driven from one condition of magnetic saturation to the opposite condition by a predetermined number of pulses 26 developed by the pulse former 24μ. The number of pulses 26 required to saturate the core of the variable magnetic counter 28u is determined by an adjustable voltage developed by an adjustable power supply. The adjustable voltage is connected in series circuit with the input winding linking the core and to which the pulses 26 are applied so as to add to the volt-second content of each input pulse. Thus, if the adjustable voltage is set at a high level, a fewer number of pulses 26 is required to saturate the core of the magnetic counter 28u. Conversely, if the adjustable voltage is set at a low level, a greater number of pulses 26 is required to saturate the core. Thus, the setting of the adjustable voltage determines the count modulus of the variable magnetic counter 28u.

For the purposes of the present disclosure, the modulus of the magnetic counter 28u may be established at values from one through nine. That is, the adjustable voltage may be set at nine different voltage levels so as to require from one to nine pulses 26 to saturate the core of the magnetic counter 28u.

As described in my above-noted copending application, after the core of the variable magnetic counter 28u has been driven past saturation by the predetermined number of input pulses 26, a sensing winding turns on a resetting transistor to send a surge of current through a resetting winding linking the core. As the core is driven to its original condition of magnetic saturation, an output pulse is induced in an output winding linking the core of the variable magnetic counter 28. This output pulse appears on line 30u of the variable magnetic counter 28u. Depending upon the selected count modulus of the variable magnetic counter 28u, the ratio of the output pulses appearing on line 30u to the input pulses 26 varies from 1:1 to 1:9.

The output pulse from the variable magnetic counter 28u on line 30u is applied to a switch, generally indicated at 34u, and to one input of an OR gate 36u. The output of OR gate 36u is connected over line 37u to the reset input of a flip-flop 40u. The flip-flop 40u controls whether or not the variable magnetic counter 28u is energized to count pulses 26 developed by the pulse former 24u. To this end, the set output of flip-flop 40u is connected over line 24u to a control input of the variable magnetic counter 28u. In the manner disclosed in my copending application, Ser. No. 363,361, flip-flop 40u controls an interstage transistor to conduct so as to pass pulses 26 from the pulse former 24u to the input winding of the variable magnetic counter 28u when the flip-flop is set. On the other hand, if the flip-flop 40u is reset, the set output appearing on line 42u cuts off the interstage transistor. As a result, pulses 26 developed by the pulse former 24u are not passed through to the input winding of the variable magnetic counter 28u, effectively disabling it.

As will be brought out in the description to follow, flip-flop 40u can be set to turn on the variable magnetic counter 28u by a positive pulse generated by one of the adder modules 12 or 14. This set pulse is applied to an input terminal 44u of the units module 10, conducted over a line 45u and through a diode D1u to the set input of the flip-flop 40u. Flip-flop 40u is reset by pulses supplied over line 37u from OR gate 36u. One source of reset pulses is the variable magnetic counter 28u generating the output pulses appearing on line 30u connected to one input of OR gate 36u. Other reset pulses are supplied from adder modules 14, 16 to input terminals 81u, 100u and 101u connected by respective conductors 82u, 102u, and 103u to separate inputs of OR gate 36u. The significance of the operation of flip-flop 40u in response to the set and reset pulses will be seen from the description of the system operation for performing a counting cycle.

The switch 34u of the units module 10 is set in conjunction with a count selector switch included in the variable magnetic counter 28u to establish the count modulus. The switch arm of the count selector switch is ganged to the switch arm 48u of the switch 34u as indicated at 72u. Thus, the setting of the count selector switch which selects the adjustable voltage in the variable magnetic counter 28u produces a corresponding setting of switch 34u. The switch 34u includes a plurality of contacts indicated as zero through nine. The switch contacts one through nine are electrically connected in common so that the switch 34u has actually only two significant switch positions. One significant switch position is indicated when the switch arm 48u contacts any one of the switch contacts one through nine. The other significant switch condition is indicated when the switch arm 48u contacts the zero switch contact. Thus, the switch 34u indicates that the count modulus of variable magnetic counter 28u has been set at either one through nine or zero. The electrically common contacts one through nine are connected to receive the output pulse from the variable magnetic counter 28u appearing on line 30u. Switch arm 48u is connected over line 62u to an output terminal 64u. The zero contact is connected over line 67u to an input terminal 66u. As will be seen more clearly from the description to follow, the switch 34u routes a pulse to a terminating module 108 signaling the attainment of the selected total pulse count by the system.

In the description to follow, the elements of the adder module 12 are referenced with the suffix *t* since, in the illustrated embodiment of my invention, this module is concerned with counting the tens digit of the selected number to which the system is to count. The units module 10, already described, is concerned with counting the units digits of the preselected number, and therefore elements of the units module were referenced with the suffix *u*. Adder module 14 is concerned with counting out the hundreds digit of the preselected number and therefore the elements of the adder module 14 are referenced with the suffix *h*. Corresponding parts of the units module 10, and the adder modules 12 and 14 are given corresponding reference numerals followed by the distinguishing suffix.

Still referring to FIGURE 1, the pulses 26 developed by the pulse former 24u, in addition to being applied to the variable magnetic counter 28u, are also applied to an output terminal 29u of the units module 10. In practice, separate output windings linking the core of the pulse former 24u develop corresponding output pulses 26 applied to terminal 29u and variable magnetic counter 28u. Output terminal 29u is connected to an input terminal 50t of the adder module 12. Terminal 50t is connected over input line 51t to a decade magnetic counter 54t. The decade counter 54t is preferably constructed in the manner disclosed in my above-noted copending application, Ser. No. 363,361, to include a saturable magnetic core requiring ten pulses 26 developed by the pulse former 24u in order to produce a single output pulse appearing on its output line 55t. Thus, the decade counter 54t has a fixed modulus of ten with an output to input pulse ratio of 1:10. In the disclosed embodiment, ten is the radix of the numbering system utilized in counting the input pulses from source 16. It will be appreciated that numbering systems based on radices other than 10 could be utilized as well.

The output pulses appearing on line 55t from the decade counter 54t are applied to the input of a variable magnetic counter 28t. Variable magnetic counter 28t is constructed in the same manner as the variable magnetic counter 28u in the units module 10. The count modulus of the variable magnetic counter 28t is established by operation of the count selector switch to set the level of the adjustable voltage supplementing the volt-second content of the output pulses developed on line 55t from the decade counter 54t. On receipt of the selected number of pulses from the decade counter 54t, corresponding to the count modulus of variable counter 28t the core of the variable counter is driven into saturation. The core of the variable counter 28t is then reset to develop an output pulse which is applied to an output line 30t. This output pulse appearing on line 30t is applied to a switch, generally indicated at 34t.

The switch 34t is constructed in the same manner as the switch 34u of units module 10. Accordingly its contacts one through nine are electrically connected together such that each receives the output pulse from the variable counter 28t on output line 30t. Switch arm 48t of the switch 34t is connected over line 62t to an output terminal 64t. When the adder module 12 is cascaded with the units module 10, output terminal 64t is connected to input terminal 66u of the units module 10. The zero terminal of the switch 34t of the adder module 12 is connected to an input terminal 66t over line 67t.

The output pulse from the variable counter 28t appearing on line 30t is also applied as one input to an OR gate 36t. The output of OR gate 36t is connected over line 37t to the reset input of a flip-flop 40t. The set output of flip-flop 40t is connected over line 42t to the control input of the variable counter 28t. When the flip-flop 40t is in its reset state, the set output of the flip-flop appearing on output line 42t cuts off the interstage transistor (not shown) disabling he variable counter 28t. On the other hand, if the flip-flop 40t is set, its set output enables the interstage transistor such that output pulses from the decade counter 54t are gated through to the input winding linking the core of the variable magnetic counter 28t. In the same manner as flip-flop 40u of the units module 10, the flip-flop 40t is reset by pulses gated through OR gate 36t. These reset pulses are supplied from the variable counter 28t and from cascaded adder module 14. Flip-flop 40t is set by positive pulses supplied from adder module 14. These set pulses are routed through a switch 70t, over line 78t and through a diode D1t to the set input of flip-flop 40t.

Multiposition switch 70t includes contacts zero through nine. Contacts one through nine are electrically tied together such that the switch 70t has two significant switch conditions wherein its contact arm 71t is contacting either the zero contact or any of contacts one through nine. As indicated at 72t, the switch arm 71t of the switch 70t is ganged along with the switch arm 48t of the switch 34t to the switch arm of the count selector switch (not shown) included in variable counter 28t. Thus, the settings of the individual switches 34t and 70t correspond to the setting of the count modulus of the variable counter 28t.

The zero contact of switch 70t is connected over line 73t to an output terminal 74t. The output pulse appearing on line 30t from the variable counter 28t is applied through a diode D2t, the parallel circuit including a capacitor C1t and a resistor R1t, and over line 73t to output terminal 74t. Output terminal 74t is connected to input terminal 44u of the units module 10 so that positive pulses are communicated over line 45t and through diode D1u to set the flip-flop 40u, enabling variable counter 28u. The diode D2t serves to pass only positive pulses from the variable counter 28t to set flip-flop 40u. The capacitor C1t serves to A.C. couple this set pulse so that flip-flop 40u sees the full pulse amplitude. Resistor R1t serves to discharge capacitor C1t.

The electrically common contacts one through nine of the switch 70t are connected over line 78t and diode D1t to the set input of flip-flop 40t. In addition, line 78t is connected to an output terminal 80t of the adder module 12. When the adder module 12 is cascaded with the units module 10, output terminal 80t is connected to input terminal 81u. Thus, a positive pulse on line 78t setting flip-flop 40t to enable variable counter 28t in the adder module 12 is applied as a resetting pulse to flip-flop 40u to insure that the variable counter 28u in the units module 10 is disabled. Line 78t is also connected to an output terminal 85t of the adder module 12. Since adder module 12 is the first adder module in the pulse counting chain, output terminal 85t is unused.

The switch arm 71t of switch 70t is connected through a diode D5t to a pair of input terminals 86t and 87t, over lines 88t and 89t, respectively.

The output pulses developed by the fixed decade counter 54t of the adder module 12 are also applied to an output terminal 59t. As in the case of pulse former 24n, the decade counter preferably includes separate output windings to develop separate output pulses for application to output terminal 59t and variable counter 28t. Output terminal 59t is connected to the input terminal 50h of the adder module 14, which, in the illustrated embodiment of the invention, is the hundreds counting stage. The input terminal 50h is connected over line 51h to a fixed decade counter 54h which is identical to the fixed decade counter 54t in the adder module 12. Having a fixed modulus of ten, decade counter 54h develops an output pulse on output line 55h for every ten input pulses received from the fixed decade counter 54t in the adder module 12. It will thus be seen that the ratio of pulses developed by the pulse former 24 in the units module 10 to the output pulses developed by the fixed decade counter 54h is 100:1.

As an important feature of the present invention, the adder module 14 is contructed in identical fashion to adder module 12 and, in fact, the two are interchangeable. In cascading adder module 14, adder module 12 and units module 10, output terminal 64h is connected to input terminal 66t and output terminal 80h is connected to input terminal 81t. As further seen from FIGURE 1, output terminal 74h is connected to input terminals 86t. Finally, output terminal 85h of adder module 14 is connected over line 90 to the input terminal 100u of the units module 10. Since in the disclosed embodiment of FIGURE 1 only three count stages are used to provide a pulse count capacity of 1 to 999, terminals 101u, 85t, 100t, 101t, and 86h are unused. However, in practice these terminals are provided whether or not used in order to preserev the identity of the adder modules. When extending the counting chain by cascading additional adder modules beyond the hundreds stage, adder module 14, the input terminals of the OR gates 36 of the lower order adder modules will then be used. This is because each adder module supplies reset pulses to the flip-flops 40 of all lower order modules. This situation is illustrated in FIGURE 1 in that adder module 14 supplies a reset pulse to flip-flop 40t via line 78h and OR gate 36t, and also to flip-flop 40n via its output terminal 85h, line 90 and OR gate 36n. It will be seen that if another adder module is added in cascade, it will supply a reset pulse to flip-flop 40h via its output terminal 80, input terminal 81h and OR gate 36h; to flip-flop 40t via its output terminal 85; a direct connection to input terminal 100t and OR gate 36t; and further to flip-flop 40u via its output terminal 85, a direct connection to input terminal 101 u, and OR gate 36u.

Returning to consideration of the units module 10, the switch arm 48u of the switch 34u is connected over line 62u to an output terminal 64u. Output terminal 64u is connected by a line 106 to the input of a terminating module 108. The terminating module 108 is preferably constructed in the manner disclosed and claimed in my copending application, Ser. No. 363,361. When the system disclosed herein has counted the number of pulses generated by the pulse source 16 equal to the preset system total pulse count, an output pulse appears at output terminal 64u of the units module 10. As described in my copending application, the terminating module 108 responds to this output pulse to develop an acceptable output on line 109 indicating that the preset total pulse count has been achieved by the counting system. The terminating module 108 may include pulse stretching means so as to provide an output pulse on line 109, of adequate time duration to perform a desired control function. The terminating module 108 preferably further includes circuit means for resetting all of the saturable cores of the counting system in preparation for the next counting cycle. Furthermore, the terminating module 108 also includes both automatically initiated and manually initiated circuit means for generating a reset pulse supplied over line 110 to the input terminal 87 of the highest order adder module of the chain. Thus, in the illustrated embodiment of FIGURE 1, the reset pulse on line 110 is applied to the input terminal 87h of the adder module 14.

To best describe the operation of the embodiment of FIGURE 1, it will be assumed that the system has been preset to a count total of 667. Thus, the system will count 667 pulses generated by the source 16 before activating the terminating module 108. This count total is indicated by the settings of the respective switches 48h, 48t and 48u. Prior to the beginning of a counting cycle, the terminating module 108 generates a positive pulse applied over line 110 to the input terminal 87h of the adder module 14. This positive pulse is passed through diode D5h and switch 71h to line 78h, since the hundreds count modulus is other than zero. This pulse is passed through diode D1h to set flip-flop 40h enabling the variable counter 28h. This pulse is also applied to output terminal 80h and gated through OR gate 36t to reset flip-flop 40t in the adder module 12. Thus, the variable counter 28t is turned off. Furthermore, from output terminal 85h the pulse on line 78h is supplied from output terminal 85h over line 90 to input terminal 100u and gated through OR gate 36u in units module 10 to reset flip-flop 40u. Thus, the variable counter 28u in the units module is turned off. The pulse former 24, and the fixed decade counters 54t and 54h, connected in iterative series, are always energized to count the pulses generated by the source 16, unlike the counting system described and claimed in my copending application, Ser. No. 363,361. In further distinction from my prior system, the variable counter 28h in the last adder module rather than the variable counter 28u in the units module is initially energized to count the pulses generated by the source 16.

For every 100 pulses generated by the pulse source 16, the fixed decade counter 54h in the adder module 14 will develop one output pulse. The variable counter 28h operates as a hundreds multipler of pulse output from decade counter 54h. Since the count modulus of the variable counter 28h is set at six corresponding to the hundreds digit of the preset count total 667, the variable counter 28h will generate an output pulse to appear on output line 30h on receipt of the sixth output pulse from decade counter 54h. Thus will occur when the source has generated a total of 600 pulses.

This output pulse is supplied to the switch 34h and is routed through switch arm 48h, line 62h, output terminal 64h, input terminal 66t and line 67t to the zero contact of the switch 34t in the adder module 12. Since the count modulus of the variable magnetic counter 28t is set at a number other than zero, i.e., six, the pulse stops there. This output pulse appearing on line 30h is also passed through OR gate 36h to reset flip-flop 40h, desabling the variable counter 28h. Furthermore, the output pulse from the variable magnetic counter 28h is applied through diode D2h, capacitor C1h to line 73h and output terminal 74h. This pulse continues on to input terminal 86t, over line 88t, through diode D5t and switch 70t, over line 78t and through diode D4t to set flip-flop 40t in the adder module 12. The variable magnetic counter 28t is thus turned on to serve as a tens multiplier counting pulses developed at the output of the fixed decade counter 54t. This pulse which sets flip-flop 40t is also applied over line 78t to output terminal 80t, input terminal 81u and through OR gate 36u to insure that the flip-flop 40u in the units module 10 is reset thus disabling variable counter 28u.

Since the now enabled variable counter 28t is set to a count modulus of six, this magnetic counter will develop an output pulse on its output line 30t to the sixth pulse received from decade counter 54t. This will occur after 60 more pulses have been generated by the pulse source 16. The output pulse on line 30t from the variable counter 28t is applied to the switch 34t, through OR gate 36t to reset flip-flop 40t, and routed via lines 73t, output terminal 74t, input terminal 44u, line 45u and diode D1u to set flip-flop 40u in the units module 10. Thus, variable counter 28t in adder module 12 is turned off and the variable counter 28u in the units module 10 is turned on. The output pulse applied to the switch 34t is routed via switch arm 48t, line 62t, output terminal 64t, input terminal 66u and line 67u to the zero contact of the corresponding switch 34u in the units module 10. However, since the count modulus of the variable counter 28u is other than zero, the pulse ends there.

At this point, the variable counter 28u is enabled to count each pulse generated by the pulse source 16 on a one to one ratio. Since the count modulus is set at seven, after seven more pulses, the variable magnetic counter 28u generates an output pulse on line 30u which is applied to the switch 34u. This pulse is conveyed over switch arm 48u and line 62u to the output terminal 64u for application to the input of the terminating module 108. The terminating module 108 operates in response thereto to generate an output pulse signalling the achievement of the present count total of the counting system. It will thus be seen that the adder module 14 has counted 600 pulses, adder module 12 has counted 60 pulses and 7 pulses were counted by units module 10. The summation of the counted pulses generated by source 16 (600+60+7) equals 667, the preset count total. The terminating module 108 then generates the pulse on line 110 to set the flip-flop 40h in the adder module 14 in preparation for the next counting cycle.

In the situation where the highest order or hundreds digit of the number counted by the system is a zero, the switch 70h will be positioned with its switch arm 71h contacting the zero contact. As a result, the pulses developed by the terminating module 108 appearing on line 110 is routed via switch 70h, line 73h, line 88t and switch 70t to set the flip-flop 40t, turning on the variable counter 28t of the adder module 12. Thus, the variable counter 28t is turned on at the beginning of the count cycle while the variable magnetic counter 28h in the adder module 14 is disabled for the entire count cycle. If the lower order tens digit of the number to be counted is also a zero, the pulse generated by the terminating module 108 is routed through switch 71h in the adder module 14, switch 71t in the adder module 12 and over line 45u to set the flip-flop 40u in the units module 10. In this situation, only the variable counter 28u in the units module is energized.

If only the tens digit of the preset count total system is a zero, the output pulse from the variable counter 28h appearing on output terminal 74h is routed through to the zero contact of the switch 70t for application over line 45u to set the flip-flop 40u of the units module 10. Thus, the adder module 12 is effectively bypassed and its variable counter 28t is not turned on. Instead, variable counter 28u is enabled after the preset pulse count of adder module 14 has been satisfied.

In the situation where the units digit of the number to be counted is a zero, the output from the variable counter 28t in the adder module 12, generated when the tens digit pulse count is satisfied, is routed through switch 34t and switch 34u to the output terminal 64u. Thus, the pulse generated by the variable counter 28t of the adder module 12 is applied to the input of the terminating module to signal the achievement of the selected count total when the units digit is a zero.

Similiary, if both the units digit and the tens digit of the count total are zeroes, the output pulse generated by the variable counter 28h of the adder module 14 is routed directly through its own adder module switch 34h, switch 34t of the adder module 12, and switch 34u of the units module 10 to the input of the terminating module 108.

The modular aspects of the system disclosed in FIGURE 1 illustrates the manner in which the system can be constructed in order to provide the customer with a system of any desired total count capacity at minimum production cost. Adder modules are simply added in cascade in order to increase the total count capacity of the system. If the customer's needs require a low total count capacity, such as from 1 to 99, the units module 10 and the adder module 12 are all that is required.

As disclosed in FIGURE 1, the units module 10 differs from the adder modules 12 and 14 in that it includes a pulse former 24 rather than a fixed decade counter 54. Moreover, the units module 10 does not require a second switch corresponding to switch 70 in the adder modules. Otherwise, the units module is identical to the adder modules. It will be noted that a switch corresponding to switch 70 of the adder module could be connected in the units module in precisely the same fashion as connected in the adder modules. If this switch is set for a count modulus other than zero, it would operate to route a set pulse supplied at output terminal 74t of the adder module 12 to the set input of flip-flop 40u so as to enable the variable counter 28u. If the count modulus of the units module 10 is zero, this set pulse merely ends up on the zero contact of the switch where it performs no function.

With this furtehr identity between the units module and the adder module effected, it will be seen that the system could be modulized in the manner shown in FIGURE 2 in order to further reduce production costs. Thus, in a system having the same total count capacity as that disclosed in FIGURE 1, the pulse former 24, decade counter 54t and decade counter 54h are connected in cascade to form one module, generally indicated at 112. The pulse former 24 develops output pulses in response to corresponding input pulses from the pulse source 16. These output pulses are applied to the decade counter 54t in module 112 and also to a variable count module indicated at 114. The variable count module 114, operating to count the units digit of the present count total, includes a variable magnetic counter 28, multi-position switches 34 and 70, OR gate 36 and a flip-flop 40. Thus, this variable count module 114 is constructed in the same identical manner as the adder modules except for the exclusion of a decade counter 54.

The output of decade counter 54t in FIGURE 2 is applied to both decade counter 54h and to a second variable count module 116. Finally, the pulse output from decade counter 54h is applied to a variable count module 118. Variable count modules 116 and 118 are constructed in the identical fashion of variable count module 114.

It will thus be seen that the variable count modules are identical regardless of which digit order of the count total it is assigned. The decade module 112 can be constructed of varying lengths. The customer then selects a module 112 having the desired total count capacity and the required number of variable count modules to be connected to the module 112.

Alternatively, the pulse former may be made as a separate module. Each count module would include both a fixed and a variable counter. The variable counter of each module is connected to receive the pulse outputs from the fixed counter in the preceding cascaded module; except for the first module wherein the variable counter is connected to the output of the separate pulse former module. However in this form of modularization, the fixed counter of the last cascaded count module is not used.

My invention can be used to perform a wide variety of control functions. For example, the pulse source 16 (FIGURE 1) may be a metering device generating pulses according to a metered variable. Once a preselected count of the pulses generated by the metering device has been achieved, the resulting output from the terminating module 108 may be used to effect a control function relating to the metered variable.

For example, the pulse source 16 may take the form of a flow meter generating pulse according to the volume of a fluid flowing through the meter. After a predetermined quantity of fluid flow as determined by a preset pulse count attained by the system of my invention, the resulting output from the terminating device 108 may be used to interrupt the flow of the fluid by operating a control valve. The control valve is open to permit fluid flow while the system is counting the pulses generated by the flow meter. The counting system is preset to count up to a number of pulses corresponding to a predetermined quantity of fluid. Once this preset count total has been satisfied, the system operates to close the control valve to interrupt the fluid flow. Thus, the system may readily be used to control the dispensing of a predetermined quantity of fluid.

A specific embodiment of my invention directed to this particular application is shown in FIGURE 3. A flow meter, indicated generally at 120, is of the type generating pulses proportional in number to the volume of liquid flowing therethrough. Such flow meters are typically of the turbine type including an impeller which is provided with an array of permanent magnets. As the impeller rotates in response to the flow of liquid, the magents induce pulses in an output winding. The pulses generated by the flow meter 120 are appled to a pulse squaring circuit generally indicated at 122. A suitable pulse squaring network may take the form of a Schmitt Trigger operating to generate uniform output pulses in response to poorly shaped input pulses generated by the flow meter 120. The output pulses from the squaring circuit 122 are applied to a pulse former 124 constructed in the manner specifically described in my copending application, Ser. No. 363,361. The output pulses developed by the pulse former are applied to a series of three cascaded fixed magnetic counters 126, 128 and 130. The fixed magnetic counters 126, 128 and 130 are constructed in the manner of the decade counters of FIGURE 1, but their fixed count modulus may be fixed at some number other than ten.

The output pulse eventually issuing from fixed counter 130 is applied to the set input flip-flop 132. The number of pulses generated by the flow meter 120 necessary to cause the fixed counter 130 to generate an output pulse to set flip-flop 132 is equal to the product of the count moduli of fixed counters 126, 128 and 130. The set output of flip-flop 132 is applied to one input of an AND gate 134. AND gate 134 is enabled so as to pass output pulses issuing from the pulse former 124 to the input of a variable magnetic counter 136 when the flip-flop 132 is set. Thus, the variable magnetic counter 136 does not receive pulses from the pulse former 124 until the flip-flop 132 has been set by the pulse output from fixed counter 130.

The output of variable magnetic counter 136 is applied to the reset input of a flip-flop 138. When flip-flop 138 is in its set condition, its set output enables an AND gate 140. As long as AND gate 140 is so enabled, an energizing voltage developed by a source 142 is gated through to hold a solenoid operated control valve 144 open so as to permit the flow of liquid in a dispensing conduit (not shown). Completing the system of FIGURE 3, a control pulse source 146 generates pulses to reset flip-flop 132 and set flip-flop 138 to initiate each liquid dispensing operation.

In order to conveniently describe the operation of the system of FIGURE 3, it will be assumed that the operation to be controlled is that of dispensing a measured quantity of liquid to fill a series of containers (not shown). The empty containers are conveyed successively to a dispensing point where the containers are filled. It will be further assumed that the volume of liquid necessary to fill each container causes the flow meter 120 to generate 600 pulses. Typically, due to the operating time required for the solenoid operated control valve 144 to close thereby terminating liquid flow, the solenoid operated valve 144 should be de-energized prior to the generation of the full 600 pulses by the flow meter 120. It will be assumed that it has been experimentally determined that the solenoid operated valve 144 should be de-energized so as to shut off fluid flow when the pulse count reaches the range of from 568 to 578. In an application such as this where the system is utilized to count up to a particular number plus or minus a small "trim" count, it is far more economical to provide cascaded fixed magnetic counters and a final variable magnetic counter rather than a completely adjustable counting system disclosed in FIGURE 1. The variable counter 136 in FIGURE 3 is conveniently used to make necessary minor corresctions in the count total required because of variations in the density of the liquid.

In the given exemplary situation where the count is found to range from 568 to 578, the count modulus of fixed counter 126 is set at nine, the count modulus of fixed magnetic counter 128 is also set at nine, and the count modulus of fixed magnetic counter 130 is set at seven. The product of these count moduli (9·9·7) is equal to 567. Thus, an output will be developed by fixed counter 130 when the pulse count generated by the flow meter 120 reaches 567. This output pulse from fixed counter 130 sets flip-flop 132 to enable AND gate 134. As a result, additional pulses generated by the pulse meter 120, squared in circuit 122 and formed in pulse former 124 are gated through to the input of the variable magnetic counter 136. On receipt of the additional number of pulses necessary to satisfy the variable modulus set for the variable magnetic counter 136, an output pulse is generated to reset flip-flop 138, disabling AND gate 140. The energization circuit for the solenoid operated control valve 144 is interrupted and the valve begins closing to terminate liquid flow. When the solenoid operated valve 144 fully colses, the exact measured quantity of liquid will have been dispensed into a container.

As the next empty container is conveyed to the dispensing point, the control pulse generator 146 is triggered either manually or automatically to generate a pulse resetting flip-flop 132 and setting flip-flop 138. The solenoid operated valve 144 is opened to dispense liquid for the fililng operation.

In the event a wider "trim" count range is required, an additional variable magnetic counter is cascaded with variable counter 136. The fixed counter 126 is used as a multiplier of the preset modulus of the added variable magnetic counter. In this situation, the control elements disclosed in FIGURE 1 are employed to control the enabling of the variable counters in appropriate sequence to count tens and units digits of the preset "trim" count.

By way of summary, it will be seen that the disclosed embodiments of my invention operate to count to a preset count total in a novel sequence wherein the highest order or most significant digit of the preset count total is counted first. Then, the next most significant digit of the preset count total is counted, and so on. Finally, the least significant or lowest order digit of the preset count total is counted as the last operating step in the counting process. When the least significant digit of the count total is satisfied, the output is generated to signal the attainment of the preset count total.

Using this novel counting sequence, the fixed counters, connected in cascaded iterative series, can remain energized. This is due to the fact that once a higher order digit is counted, the fixed counter whose output to a variable counter resulted in the output signifying that the higher order digit has been counted, cannot again produce an output before the count total is counted. Consequently, no control circuitry to disable the higher order fixed counters while the lower order variable counters count the lower order digits of the preset count total is required. The elimination of this control circuitry not only simplifies the construction of the individual modules, but significantly reduces the production cost of each module.

It will be appreciated that the principles of my invention can be applied to high count systems employing fixed and variable counters other than magnetic counters.

Although the disclosed embodiment of my invention operates on the basis of the decimal numbering system with the radix of ten, it will be appreciated that other numbering systems having different radices could be used. Inasmuch as the multi-position switches disclosed in FIGURE 1 have only two significant switch conditions according to whether the count modulus of the associated variable counter is zero or not zero, these switches need only have two contacts rather than the disclosed zero through nine contacts.

In the disclosed embodiments of FIGURE 1 conventional flip-flops are used to control the selective enabling and disabling of the variable counters. It will be appreciated that other forms of electronic switching devices may be used to perform the same function. An electronic switching device ideally suited for this purpose is the latching circuit 16 disclosed in the copending application of Klaus Wallentowitz for "Electronic Timer Circuit," Ser. No. 405,503, filed Oct. 21, 1964 and assigned to the assignee of the instant application. This latching circuit is preferably employed in conjunction with modified counter interstage circuitry as disclosed in the application of Lundin and Bosman for "Electronic Switching Circuit for Counters," filed concurrently herewith and assigned to the assignee of the instant application. The disclosures of the aforementioned copending applications are incorporated herein by reference.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings should be interpreted as illustrative and not in a limiting sense.

Having described my invention, what I claim as new and desire to secure by Letters Patent is:

1. A counter for counting a multi-digit number, said counter comprising, in combination:
   (A) at least one fixed count counter;
   (B) at least one variable count counter of a less significant digit of said number than the more significant digit of said number counted by said fixed count counter; and
   (C) control means,
      (1) responsive to the attainment of the count of said more significant digit by said fixed counter,
      (2) for initiating counting of said less significant digit by said variable count counter.

2. A selectable count counter for providing an output upon the attainment of a preselectable total multi-digit count comprising, in combination:
   (A) a plurality of fixed and variable counters
      (1) said fixed counters connected in iterative series to provide a fixed count output upon the attainment of a total fixed count equal to the fixed counts of said fixed counters multiplied together,
      (2) each of said variable counters having an input connected to the output of one of said fixed counters, and;
   (B) control means responsive to said fixed count output for enabling said variable counters to successively and individually count the digits of the preselected total count beginning with the highest order digit and progressing to the lowest order digit.

3. A selectable count counter for counting to a selectable multi-digit count total, said counter comprising, in combination:
   (A) a plurality of variable counters adjustable to count from zero up to one less than a predetermined radix X,
      (1) one of said variable counters operating to count each selectable order digit of said count total;
   (B) a plurality of fixed counters
      (1) each fixed counter capable of counting up to and including said radix X,
      (2) said fixed counters connected in iterative serial order such that each fixed counter but one supplies the input count to another,
      (3) said one fixed counter supplying a first output upon the attainment of a count equal to $X^n$, where $n$ equals the number of said fixed counters, and
      (4) each of said variable counters connected to the output of a selected one of said fixed counters; and
   (C) control means
      (1) operating to connect the highest order digit variable counter to the output of said one fixed counter supplying counts $X^n$,
         (a) each $X^n$ count being a count of the highest order digit of said count total,
      (2) said control means further responsive to the attainment of the highest order digit count by said highest order digit variable counter for operatively connecting the next lower order digit variable counter to the output of the fixed counter supplying counts of that order digit,
      (3) and so forth until the lowest order digit variable counter has attained its preadjusted digit count corresponding to the lowest order selectable digit of said multi-digit count total.

4. A selectable count counter for counting to a selectable multi-digit count total, said counter comprising, in combination:
   (A) a plurality of fixed counters,
      (1) each fixed counter capable of counting up to and including a predetermined radix X,
      (2) said fixed counters connected in iterative serial order such that the output of one is connected to the input of the next connected one in said iterative serial order,
         (a) the output of each fixed counter being a fixed count equal to $X^{n+1}$, where $n$ equals the number of preceding fixed counters connected in said iterative serial order, and
         (b) the output of each fixed counter being a count of a different higher order digit of said count total;
   (B) a plurality of variable counters adjustable to count from zero to one less than said radix X
      (1) each of said variable counter adapted to count one selectable order digit of said count total and connectable to the output of the corresponding fixed counter providing counts of the corresponding order digit;
   (C) control means
      (1) responsive to the attainment of the highest order digit count by the corresponding variable counter for operatively connecting the next lower order digit variable counter to the output of the corresponding fixed counter,
      (2) and so forth until the lowest order digit variable counter attains the digit count of the lowest order selectable digit of said count total.

5. The counter defined in claim 4 wherein said fixed and variable counters are magnetic counters.

6. The counter defined in claim 4 wherein said control means further includes
- (3) switching means operating to bypass those variable counters corresponding to order digits of the count total which are zeros.

7. A counter comprising, in combination:
- (A) a plurality of counting stages corresponding to the digit orders of a number system each of said counting stages comprising
  - (1) a fixed counter for counting up to and including the radix of the number system, and
  - (2) a variable counter connectable to the output of said fixed counter to count up to one less than said radix; and
- (B) control means, coupled to said counting stages, for causing said counting stages to count selected digits in reverse order from highest digit order to lowest digit order.

8. A modular counting system comprising, in combination:
- (A) a fixed count module
  - (1) said fixed count module comprising a plurality of fixed count counters connected in iterative serial order; and
- (B) a plurality of variable count modules each comprising
  - (1) a variable count counter operatively connectable to the output of one of said fixed count counters in said fixed count module, and
  - (2) control means
    - (a) said control means of each variable count module interconnected for sequentially counting the individual digit orders of a multi-digit count total from highest digit order to lowest digit order.

9. A counting system for counting to a selectable multi-digit count total, said system comprising, in combination:
- (A) a plurality of fixed count modulus counters connected in cascaded serial order such that the output of one is connected to the input of next one in said cascaded serial order
  - (1) the input of the first of said cascaded fixed counters connected to source of pulses to be counted in order to attain a selectable count total,
  - (2) the output of each fixed counter providing a digit count of a different one of the digits of said count total;
- (B) a plurality of variable counters each having an adjustable count modulus preset to correspond to the digit count of a different one of said digits of said count total
  - (1) said variable counters being individually connectable to the outputs of the fixed counters providing the digit count of the digit corresponding to their individually preset count moduli; and
- (C) control means
  - (1) operating in response to an output generated when a variable counter has counted the digit counts equal to the highest order digit of said count total
    - (a) for connecting another one of said variable counters to the output of the fixed counter providing the digit count of the next lower digit order of said count total, and for
    - (b) continuing to so operate in response to outputs from remaining variable counters as the digit counts of each digit of said count total provided by said fixed counters are attained in sequence from highest order digit to lowest order digit.

10. The system defined in claim 9 wherein said fixed and variable counters are variable magnetic counters.

11. The system defined in claim 10 wherein said control means comprises switching means operating to maintain those variable counters whose count moduli are zero disconnected from said fixed counters.

12. The system defined in claim 11 wherein said switching means operates to omit those variable counters whose count moduli are zero from the counting operation sequence.

13. The system defined in claim 12 wherein said switching means further operates to route an output pulse generated by the variable counter counting the lowest order non-zero digit of said count total to a system output terminal signalling the attainment of said count total.

14. The system defined in claim 13 wherein said control means further operates to disconnect said variable counters from the outputs of said fixed counters when each digit count is attained in sequence.

15. A metering device comprising, in combination:
- (A) means producing pulses proportional in number to a quantity to be metered;
- (B) fixed count counting means for counting a predetermined number of said pulses and thereupon producing a fixed count output signal;
- (C) variable count counting means, comprising
  - (1) means for selecting a variable count to be counted,
  - (2) means responsive to said fixed count output signal for enabling said variable count counting means to count the number of said pulses equal to said selected variable count and thereupon produce a variable count output signal.

16. The metering device defined in claim 15 wherein said variable count counting means comprising a plurality of variable counters each for counting a digit of said selected variable count.

References Cited

UNITED STATES PATENTS 3,226,562  12/1965  Neitzert.
3,229,077  1/1966  Gross.

MAYNARD R. WILBUR, *Primary Examiner.*

GREGORY J. MAIER, *Assistant Examiner.*